April 7, 1959 E. A. BROWN 2,880,997

PAPER FEEDING DEVICE

Filed Aug. 22, 1955

INVENTOR.

EDGAR ALAN BROWN

BY

G. L. Gugger

AGENT

United States Patent Office 2,880,997

Patented Apr. 7, 1959

2,880,997

PAPER FEEDING DEVICE

Edgar A. Brown, Owego, N.Y., assignor to International Business Machines Corporation, New York, N.Y., a corporation of New York Application August 22, 1955, Serial No. 529,750

5 Claims. (Cl. 271—45)

This invention relates to a paper feeding device and more particularly to a clutching means for rapidly initiating movement of a sheet of paper at rest.

In many applications, particularly in the record controlled accounting machine field, it is desirable to stop the feeding of a record sheet or card leaving the sheet at rest at some operating station along the feed and then at some fixed or variable time later to continue feeding of the sheet. Accordingly, it is the main object of the present invention to provide a simple and efficient method for restarting the movement or feed of a sheet.

According to the invention, a continuously running endless tape type of conveyor is used and means under control of electromagnetic forces are provided for suitably clamping a loose sheet or record card to the surface of the tape to restart movement of the sheet.

In one advantageous embodiment of the invention the tape conveyor is caused to pass between two devices, of which one, which primarily comes into contact with and supports the record sheet, is provided with a series of free ferromagnetic rollers, whereas the other device comprises means for subjecting the rollers to electromagnetic forces to cause the rollers to press the sheet against the surface of the moving tape.

In a further advantageous embodiment of the invention the tape conveyor is caused to pass between a movable shoe of ferromagnetic material and a device comprising means for subjecting the shoe to electromagnetic forces. In this instance, the record sheet rests lightly on the tape, the shoe serving to pinch the sheet between same and the tape for movement therewith.

A further preferable embodiment of the invention consists of two juxtaposed continuously running endless tape conveyors, one of said tapes being composed of ferromagnetic material and the other tape being composed of non-ferromagnetic material. Here, the record sheet rests between the two tapes and a device is provided on the other side of the nonmagnetic tape for subjecting the ferromagnetic tape to electromagnetic forces. As a result, the sheet is pinched by the two tapes for movement therewith.

Several highly desirable features may be found in an endless conveyor system employing any of the various magnetic clutching means illustrated in the several embodiments of the present invention. For example, there are no mechanical linkages or connections between the two portions of the various magnetic clutching devices except the magnetic flux lines themselves, and consequently record sheets may be fed into the clutching station from any one of several directions. Another important feature is that sheets of varying thickness can be accommodated with a single set-up of the clutching means. Also, since at least one portion of the clutching means is yieldable to a certain extent in a direction opposed to the clutching action, the probability of sheet or card jams occurring at the clutching station is greatly decreased.

It has also been found that the present invention possesses the desirable feature of being able to impart a quick start to the record sheet due to the fact that there is very little mass to be moved. With the present invention the sheet is clutched quickly without having to wait for undue mechanical motions to occur.

Another desirable feature resides in the fact that possible clutch wear is reduced to a minimum because the clamping action is distributed over the surface of a long tape. It is also possible, if desired, to employ a plurality of the novel clutch devices along a single endless tape.

Finally it has been found that the invention works equally well on different kinds of paper as well as on record cards either with or without perforated holes therein.

Other objects of the invention will be pointed out in the following description and claims and illustrated in the accompanying drawing, which discloses, by way of examples, the principle of the invention and the best mode, which has been contemplated, of applying that principle.

The invention will now be described more fully with reference to the accompanying drawing, in which.

Figure 1:
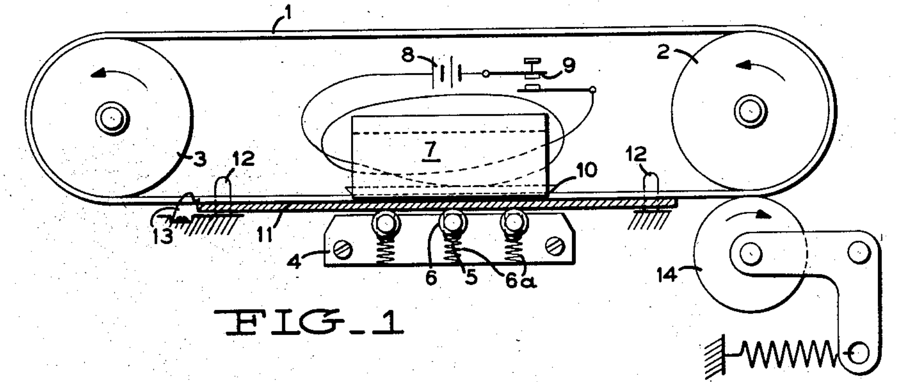
Fig. 1 shows an endless conveyor and magnetic clutching means comprising free rollers as contact elements.

Referring to Fig. 1, 1 designates a conveyor of nonmagnetic material, such as nylon, which is mounted in the form of an endless tape of belt between two cylinders 2 and 3. At least one of the cylinders is driven so that the tape moves continuously in a counterclockwise direction.

Mounted adjacent to the outer surface of the tape is a roller device which comprises a support block 4 having a series of slots 5 whose slightly tapered sides are adapted to support the reduced ends of free ferromagnetic rollers 6. Opposite the rollers and adjacent to the inner surface of the tape is an electromagnet 7 which may be connected to a suitable direct current source 8 through a switch 9. A suitable bar 10 of nonmagnetic material having a low coefficient of friction is fastened to the magnet and serves as a pressure bar for the tape and rollers.

In the particular examples chosen, the record sheet 11 is fed in at right angle to the direction of tape feed and passes between the tape and the rollers 6 until it strikes a pair of fixed stops 12. A low pressure retaining finger 13 is provided which may pinch the sheet to a suitable bedplate to overcome any frictional force that may be normally exerted on the sheet by the continuously moving tape and the sheet is supported at rest on the rollers 6, said rollers being biased against the sheet by light springs 6*a*. When it is desired to again move the record sheet, switch 9 is closed and the electromagnet will pull the free rollers 6 against the record sheet, tape and bar 10 with sufficient force to allow the tape to rapidly move the sheet toward cylinder 2. Switch 9 need only be closed for an instant since a spring tensioned roller 14 cooperates with the cylinder 2 to feed the sheet on to the next station.

Figure 2:
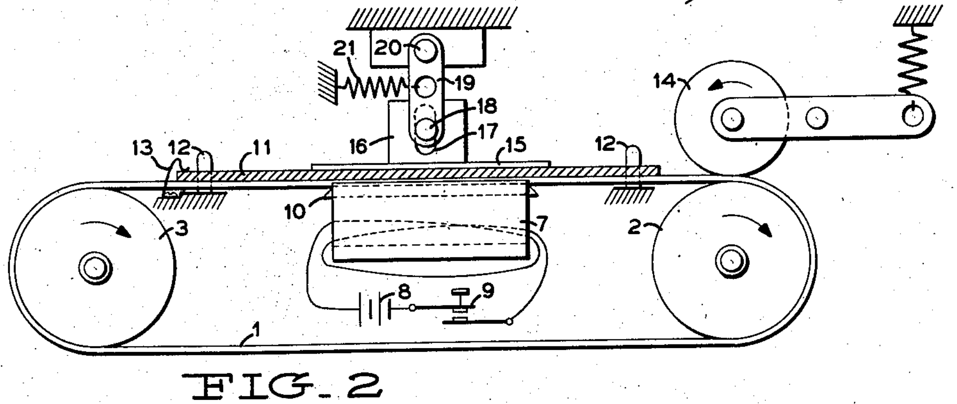
Fig. 2 shows an endless conveyor and magnetic clutching means comprising a pivoted shoe as the contact element.

In the embodiment shown in Fig. 2, the like reference numerals are intended to have the same meaning as given them in connection with Fig. 1. In this instance, the record sheet is retained at rest on the tape and between the electromagnet 7 and a thin ferromagnetic shoe or plate 15. The magnetic plate is fastened to a member 16 which has a pivot connection, through a slot 17 and stud 18, with a pair of links 19 pivoted on a fixed stud 20.

When it is desired to move the record sheet, switch 9 is closed and the sheet will be firmly clamped between the moving tape and the movable magnetic plate. The sheet will be moved to the right by the tape and magnetic plate, the plate also moving along by virtue of its slotted connection, and subsequently the sheet will be fed on to the next station by rollers 14 and the cylinder 2. When the switch is opened, the shoe assembly will be returned to its normal position by springs 21 in readiness to feed another sheet.

Figure 3:
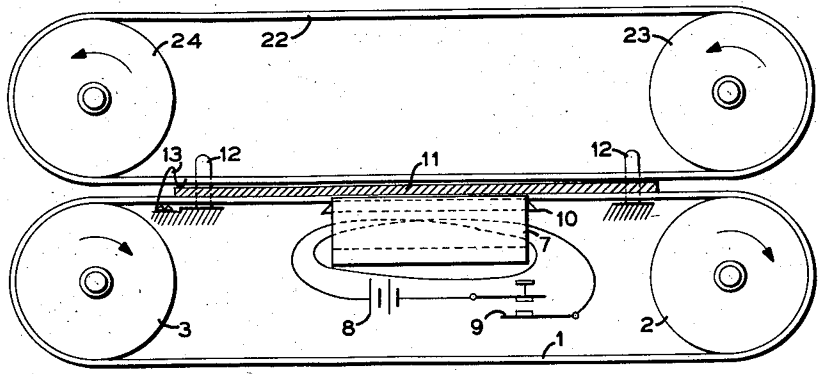
Fig. 3 shows two endless conveyors and magnetic means for clamping them in an operative position.

Turning now to the embodiment shown in Fig. 3, here again the like reference numerals are intended to have the same meaning as given them in connection with Figs. 1 and 2. In this example, the sheet is fed in between the continuously moving tape 1 and a continuously moving ferromagnetic tape 22 mounted in the form of an endless tape or belt between two cylinders 23 and 24. The sheet is supported at rest on the lower tape 1 and in alignment with the electromagnet 7, the normal force acting on the sheet by the weight of the tape 22 being insufficient to overcome the retaining force of finger 13 to drive the sheet. Upon closure of the switch, the build up of magnetic flux between the electromagnet and the magnetic tape will cause a large normal force to occur between the tapes and the record sheet experiences a large accelerating force in moving to the right with the tapes.

It is clear from the examples shown that in the one case only the mass of the record sheet need the accelerated and in the other cases there is only the slight additional inertia of the small needle rollers or the thin ferromagnetic shoe. It is pointed out that in each case the heavier parts of the clutch are continuously driven and it is only necessary to move the thin minute components which have low inertia. Consequently, a rapid and effective start of the record sheet is easily accomplished. It is also noted that feeding of the sheets may be carried out in either direction simply by reversing the drive to the tapes.

It is also possible, by slowing down or stopping the tape drive, to use the present device as a decelerating or braking mechanism for sheets in motion.

It should be understood that the circuit switch means should not be limited to the manually operated key type shown but that any suitable selective switching means could be used, such as cam controlled contacts or the like. Also, the continuously moving conveyor need not necessarily be an endless tape or strip but could be a driven roller against which the sheet could be pinched, for example, by the aforementioned ferromagnetic needle rollers.

While there have been shown and described and pointed out the fundamental novel features of the invention as applied to preferred embodiments, it will be understood that various omissions and substitutions and changes in the form and details of the device illustrated and in the operation may be made by those skilled in the art, without departing from the spirit of the invention. It is the intention, therefore, to be limited only as indicated by the scope of the following claims.

What is claimed is:

1. In a device of the class described, a continuously moving conveyor strip, electromagnetic means adjacent one side of said strip, free rolling elements adjacent the other side of said strip and operable by said electromagnetic means, means for supporting a sheet at rest between said strip and said elements, and means for selectively operating said electromagnetic means to cause said elements to clamp the sheet to said strip for movement therewith.

2. In a device of the class described, a continuously moving conveyor strip, electromagnetic means adjacent one side of said strip, free rolling elements operable by said electromagnetic means, means for movably supporting said elements adjacent the other side of said strip, means for supporting a sheet at rest between said strip and said elements, and means for selectively operating said electromagnetic means to cause said elements to move into engagement with said sheet and strip.

3. In a device of the class described, a continuously moving conveyor strip, electromagnetic means adjacent one side of said strip, a plurality of free rollers adjacent the other side of said strip and supported for movement toward said strip under control of said electromagnetic means, means for supporting a sheet at rest between said rollers and said strip, and means for selectively operating said electromagnetic means to move said rollers against said sheet and strip to effect movement of said sheet by said strip.

4. In a device of the class described, a continuously moving conveyor strip, electromagnetic means adjacent one side of said strip, a movable ferromagnetic strip adjacent the other side of said first strip, means for supporting a sheet at rest between both said strips, and means for selectively operating said electromagnetic means to cause movement of said ferromagnetic strip against said sheet and first strip to effect movement of said sheet by both of said strips.

5. In a device of the class described, a pair of juxtaposed movable endless tapes, means for continuously driving both of said tapes, one of said tapes comprising ferromagnetic material and the other being of nonmagnetic material, means for supporting a sheet at rest between both said tapes, electromagnetic means supported in alignment with said sheet and on the opposite side of said nonmagnetic tape, and means for selectively operating said electromagnetic means to clamp said ferromagnetic tape and said sheet to the other continuously moving tape for movement therewith.

References Cited in the file of this patent

UNITED STATES PATENTS

| | | |
|---|---|---|
| 1,561,063 | Dunlap | Nov. 10, 1925 |
| 1,946,874 | Nicholas | Feb. 13, 1934 |
| 2,263,721 | De Lorme | Nov. 25, 1941 |
| 2,576,881 | Koole et al. | Nov. 27, 1951 |